Dec. 13, 1960  R. K. SCHWEBS  2,964,411
PROCESS OF PACKAGING FRESH CORN
Filed Aug. 10, 1955  3 Sheets-Sheet 1

INVENTOR
ROBERT KENT SCHWEBS

BY Young and Wright
ATTORNEYS

Dec. 13, 1960 R. K. SCHWEBS 2,964,411
PROCESS OF PACKAGING FRESH CORN
Filed Aug. 10, 1955 3 Sheets-Sheet 2
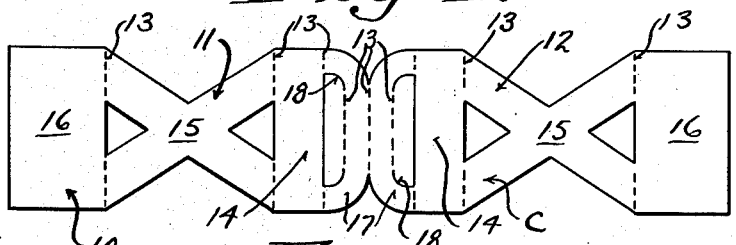
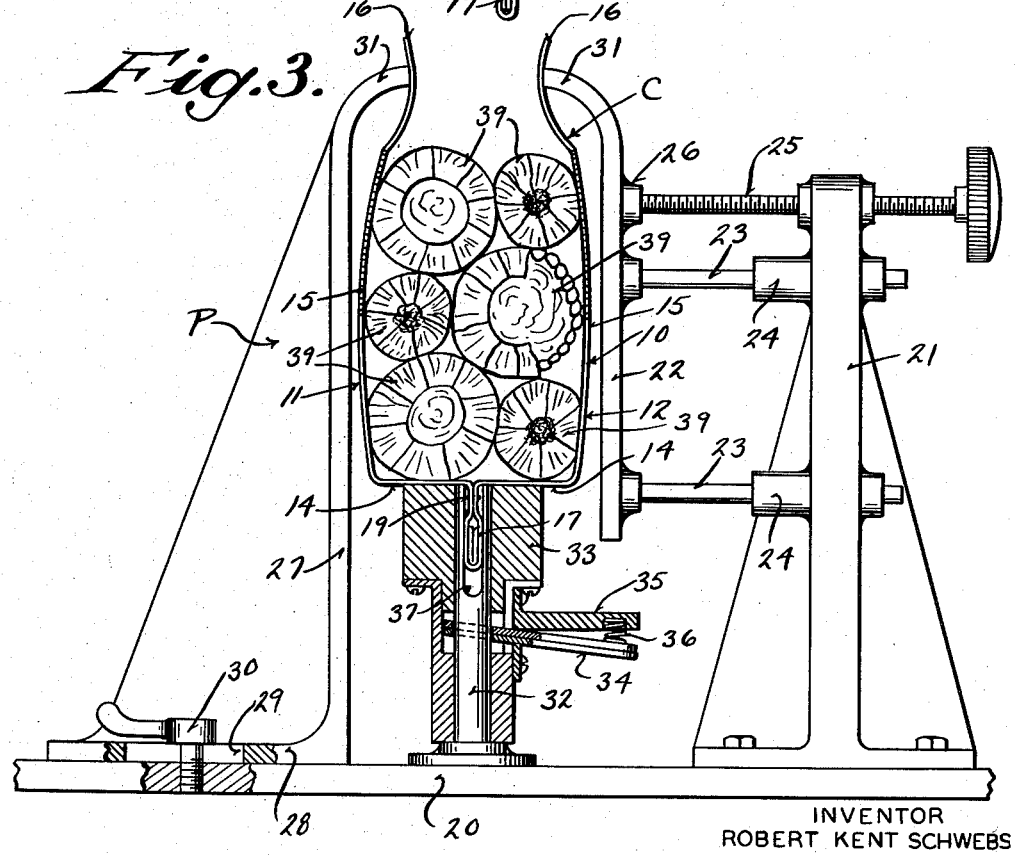
INVENTOR
ROBERT KENT SCHWEBS
BY
Young and Wright
ATTORNEYS Dec. 13, 1960 R. K. SCHWEBS 2,964,411
PROCESS OF PACKAGING FRESH CORN
Filed Aug. 10, 1955 3 Sheets-Sheet 3
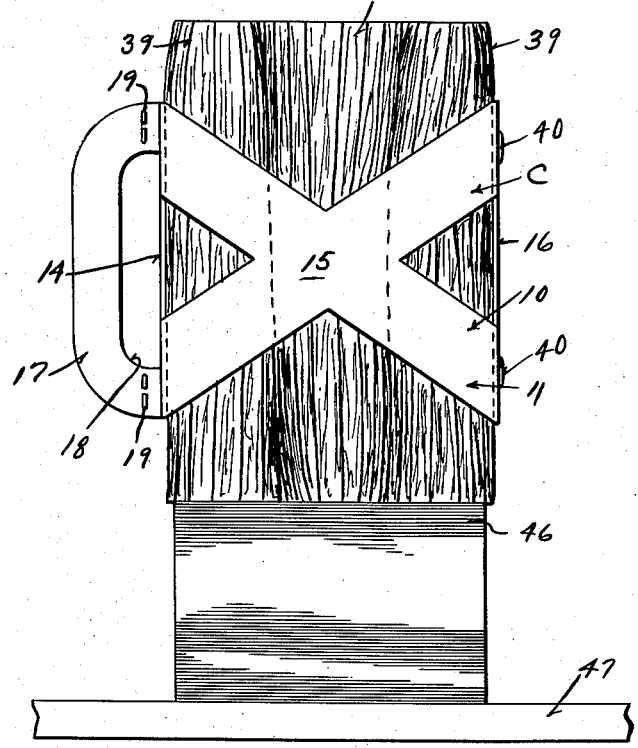
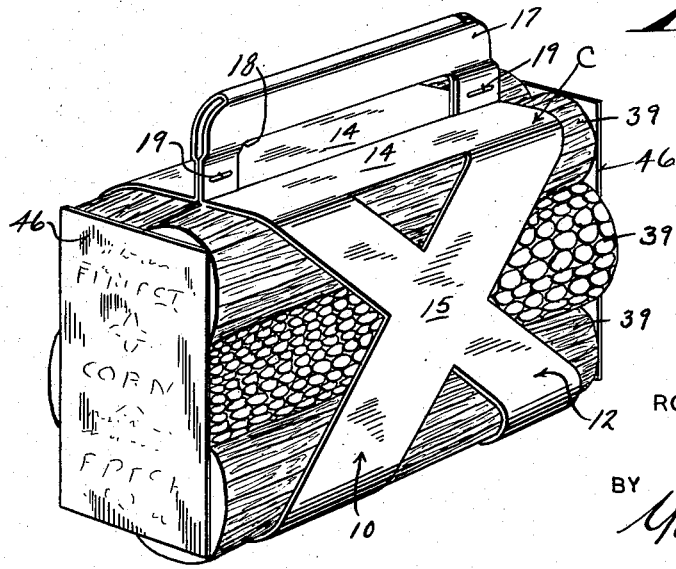
INVENTOR
ROBERT KENT SCHWEBS
BY
*Young and Wright*
ATTORNEYS United States Patent Office 2,964,411
Patented Dec. 13, 1960

2,964,411

PROCESS OF PACKAGING FRESH CORN

Robert Kent Schwebs, 513 N. Bateman, Appleton, Wis.

Filed Aug. 10, 1955, Ser. No. 527,485

2 Claims. (Cl. 99—171)

This invention appertains to the merchandising of goods for green and like grocery stores, and more particularly to the packaging of ears of fresh, sweet corn for the retail trade.

Fresh corn is usually sold to the housewife from loosely stacked ears of corn placed on counters or in bins. In order to maintain the corn in a fresh condition, cracked ice is usually packed around the same. This is objectionable from many standpoints. The housewife usually picks up the corn and tears back the husks to see the grain of the corn, and often the thumbnail is used to crush one or more grains to see if the corn is tender. Obviously, such handling ruins many ears of corn. After the corn is selected by the housewife, the same is bagged and this entails expense and additional time. Quite often less ears of corn are charged for than are actually placed in the bag. It has been proposed to pre-package the corn in sealed pliofilm or like bags. This prevents the icing of the corn and full inspection by the housewife and the corn in the sealed bags tends to swell and spoil quickly.

One of the primary objects of my invention is to provide a novel means or process for packing the green corn in open waxed containers, preferably provided with a carrying handle, whereby the corn can be stacked and viewed by the housewife and whereby cracked ice can be readily placed about and in direct contact with the ears of corn in the package.

Another salient object of my invention is the provision of novel means for placing the containers or cartons about the desired number of ears, say six, before the sealing or securing of the carton, with the ears arranged in such a manner relative to one another that upon the application of pressure, the ears will be compacted and inter-locked together and firmly held against movement relative to one another in their compact condition, whereby the carton can then be brought completely around the bundle and secured to hold the corn in an attractive manner and in such a manner that the same can be readily lifted and carried by the housewife.

A further object of my invention is to provide means whereby both ends of the ears at the opposite ends of the package can be sawed off square to form the small bundle and to add to the appearance of the package and the corn and thus increase the salability thereof.

A further important object of my invention is the provision of means for sealing the ends of the sawed or cut corn by wax or the like to aid in keeping the corn fresh and to facilitate the placing of covering labels on the ends of the package to further aid in keeping the corn fresh and in place in the package, the peeling of the wax from the corn permitting the quick removal of the silk from the corn in that such silk will be matted and affixed in the wax.

Another further object of my invention is the provision of a novel press for compacting the bundles of corn in four directions to insure the proper forming of the bundles.

A still further object of my invention is to provide a novel open carton for corn to facilitate the packing, holding, icing and carrying of the corn and particularly, one which can be readily placed around the corn during the forming of the compact bundle.

With these and other objects in view, the invention consists in the novel construction, arrangement and formation of parts, as will be hereinafter more specifically described and claimed, and illustrated in the accompanying drawings, in which drawings, Figure 1 is a top plan view of the blank of the novel carton;

Figure 2 is a side elevational view of the carton on a larger scale than Figure 1, and showing the carton in its partially set up, folded condition to form the carrying handle;

Figure 3 is a side elevational view of the novel press utilized in my process and showing a carton in position therein and receiving the corn, parts of the figure being shown broken away and in section;

Figure 7 is a side elevational view showing another step in my process of applying the labels to the ends of the ears of corn in the package after the waxing step, and Figure 8 is a perspective view showing the complete package of corn ready for sale to the retail trade.

Referring to the drawings in detail, wherein similar reference characters designate corresponding parts throughout the several views, the letter C generally indicates my novel carton utilized in the process of forming a compact bundle of fresh corn.

Figure 4:
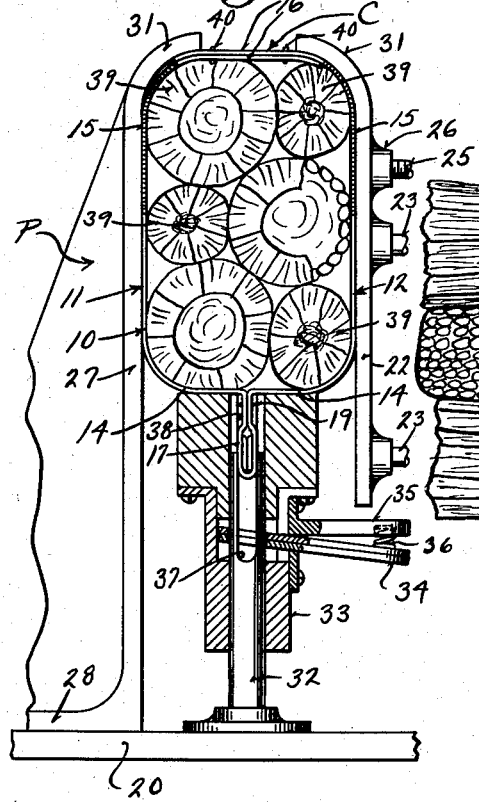
Figure 4 is a fragmentary side elevational view of the press similar to Figure 3 but showing the carton completely passed around the corn and the corn lifted in the press and receiving pressure to form the compact bundle.

The carton C is formed from a single sheet 10 of paper stock and this sheet is preferably heavily waxed or otherwise impregnated to resist moisture. The blank 10 includes like, companion sections 11 and 12 each scored on transverse lines 13 to form top walls 14, side walls 15 and bottom wall flaps 16. The top wall portions 14 have formed thereon handle extensions 17 which are integrally connected and these handle extensions 17 are cut and scored to form hand holes 18 and the material struck out from these hand holes can be folded back to facilitate the forming of substantial handles that will not cut into the hand of a person carrying the package. The side walls 15, and other walls, if so desired, can be cut out in any desired way so as to provide an open carton and thus expose to view a maximum amount of the corn held by the carton.

As best shown in Figure 2, the blank is first folded at the point of juncture of the handle extensions 17 and then the handle extensions are bent at right angles to the top wall portions 14. Staples or the like 19 can now be employed to hold the handle in its set up condition at right angles to said top wall portions 14. In conjunction with the carton C, I utilize a novel press P shown in some detail in Figures 3 and 4. This press P includes a base plate 20 having rigidly mounted thereon an upright bracket or casting 21 for slidably supporting a compression jaw 22. The jaw 22 carries outwardly extending smooth guide rods 23, slidably mounted in bearing bosses 24 carried by the bracket. Threaded in the upper end of the bracket is a hand screw 25 and this screw is rotatably mounted in a bearing boss 26 formed on the jaw 22. The jaw 22 will be hereinafter more fully referred to.

Opposed to the jaw 22 is a somewhat similar normally stationary jaw 27. The jaw 27, however, is provided with a base 28 mounted on the plate 20 and this jaw can be initially slid on the base to an adjusted position, for a purpose which will be later brought out. The base 28 is provided with a longitudinally extending slot 29 which receives a hand screw 30 threaded into the plate 20 and by loosening and tightening this hand screw the jaw 27 can be initially adjusted relative to the jaw 22 and after such adjustment the jaw is held tight by the screw to hold the same against further movement.

It is to be noted that the jaws 22 and 27 each include flat opposing faces and that the upper ends thereof are curved inwardly toward one another, as at 31, and this is an important feature of the press.

Mounted between the jaws 22 and 27 on the plate 20 is an upright rigid standard 32. Slidably mounted on the standard is a base block 33. The base block 33 is freely moved up and down on the standard and is locked in a selected position thereon against downward movement by manually actuated tilting plates 34. The outer ends of the tilting plates 34 extend beyond the block and below a rigid handle 35. The tilting lock plates are provided with openings of a slightly greater diameter than the post 32 and by pressing on the outer ends of the plates, the plates 34 can be brought to a horizontal position so that the block can be raised up and down. Upon release of the plates 34 a spring 36 moves the plates to an acute angle relative to the standard, with the openings in the plates out of direct longitudinal alignment with the standard so that the exposed edges of the openings in the plates will grip and bind on the standard. It is to be noted that the standard is provided with a longitudinally extending slot 37 which opens out through the upper end thereof. The block itself is provided with a similar slot 38.

In accordance with my process, the jaw 22 is moved away from the jaw 27 and the carton is placed between the jaws with the handle extensions 17 in the slots 37 and 38, it being understood that the block 33 is in its lowered position, as shown in Figure 3. Ears of corn 39 are now placed in the carton with the ears arranged in opposite directions so that the butt ends of certain ears will be opposed to the narrow ends of other ears. After the desired number of ears 39, say six, are placed in position in the carton between the jaws, the bottom wall flaps 16 are then folded over the ears of corn and one upon the top of the other. The block 33 is now raised (see Figure 4), to push the ears of corn up to the arcuate ends 31 of the jaws 22 and 27. The jaw 27 can now be initially adjusted relative to the diameter of the ears of corn and to dispose the jaw 27 a desired distance away from the standard 32, so as to center the ears of corn relative to both the jaws. After this initial adjustment, then the jaw 22 is forced into intimate pressing contact with the ears of corn by the hand screw 25, and as the jaw 22 moves in, pressure will be applied to the opposite sides of the package and the curved extensions 31 of the jaws will press down on the ears of corn and force the ears of corn down toward the block 33. In effect, this creates a four-way pressure on the ears of corn and the ears of corn, due to their stacking arrangement, are firmly pressed together and interlocked into a compact bundle. While this compact bundle is still held in the press a hand stapling machine or the like is utilized to apply staples or wire stitches 40 to the over-lapping bottom wall flaps 16. Thus these bottom wall flaps will be secured together and the entire bundle held in its compact form. The bundle is now removed from the press by feeding back the jaw 22 and with the bundles so-formed the next step in my process is followed out.

Figure 5:
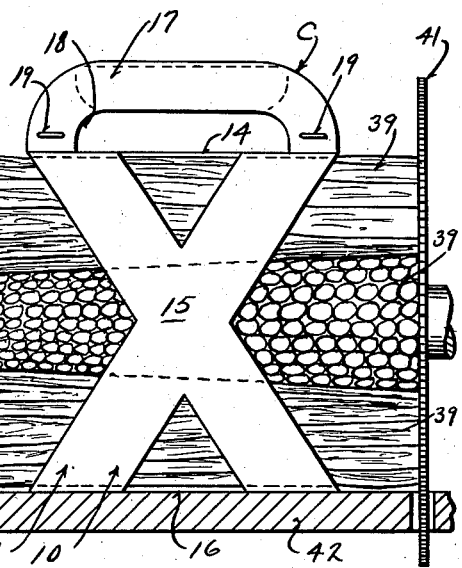
Figure 5 is a side elevational view of the partially formed bundle of corn firmly held in its desired shape by the carton and showing a step in my process of sawing off the ends of the ears of corn in the bundle.

This next step, see Figure 5, consists of sawing off the ends of the ears of corn 39 in the package square and this can be done by feeding the ends of the corn to a rotary saw 41. The saw 41 can be rotatably supported on any type of table 42 and obviously, the saw can be driven in any desired manner. After the sawing off square of the ears of corn at both ends of the package, the next step of my process can be carried out.

Figure 6:
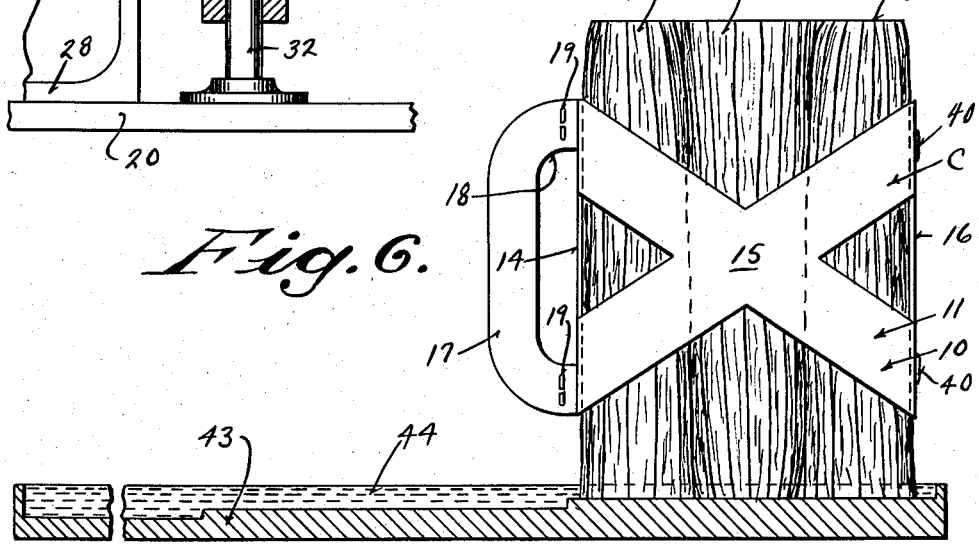
Figure 6 is a view illustrating a further step in my process and showing the means of applying wax to the opposite ends of the cut ears of corn in the package.

This step, see Figure 6, consists of applying melted wax to the opposite ends of the ears of corn. As shown in Figure 6, I can utilize a shallow pan 43 containing melted wax 44, and the wax can be held in a molten condition by any desired type of heater, such as a gas burner 45. Preferably, the wax is at an exact depth at certain portions of the pan so that the ears of corn can be immersed, say ⅛", in the wax. After the ends of the ears of corn are waxed and while the wax is still in its hot condition, the package is then quickly grasped by the operator and moved on top of a stack of printed labels 46 and the uppermost label in the stack will be secured to the ends of the ears by the hot wax. As soon as a label is placed on one end of the package, the package is quickly turned over and the label is placed on the other end of the package. The labels can be stacked in any type of support, such as a table top 47. The labels are preferably of a size to substantially cover the ends of the ears of corn and with the placing of the labels on the ends of the ears of corn, the package is completed and is ready for sale. The complete package is best shown in Figure 8. If preferred, one or more of the ears of corn can be stripped back so as to expose the kernels to view, and this will facilitate the selection of a package by a housewife. As the package is of an open-work construction, obviously, ice can be placed around the same in contact with the ears of corn. Due to the compact form of the package, a number of packages can be readily stacked one on top of the other and in this instance, the handle extensions can be folded down against the top wall portions 14.

With my improved process and package the corn presents a very pleasing and attractive appearance to the trade and obviously, the package can be picked up by a person without coming into contact with said ears of corn.

Changes in details may be made without departing from the spirit or the scope of this invention, but what I claim as new is:

1. The process of packaging fresh ears of corn for the retail trade with the husks thereon which consists, first, selecting ears of corn and placing the ears of corn in superimposed rows in a carton of the strap type having overlapping ends with the ears of corn extending in opposite directions to dispose small ends and butt ends in alternate relation; second, compacting the corn and carton in a bundle; third, securing the overlapping ends of the carton together tight around the corn while the corn is being compacted leaving certain intermediate portions of the husk exposed; fourth, sawing off the opposite ends of the ears of corn to form a square package and fifth, sealing the exposed cut ends only of the corn by dipping in hot paraffin.

2. The process of packaging fresh ears of corn for the retail trade with the husks thereon as defined in claim 1, and finally securing labels to the ends of the package by the paraffin while the paraffin is in its hot condition.

References Cited in the file of this patent

UNITED STATES PATENTS

| | | |
|---|---|---|
| 1,004,033 | Johnson | Sept. 26, 1911 |
| 1,013,244 | Watson | Jan. 2, 1912 |
| 1,273,781 | Helfenstein | July 23, 1918 |
| 2,190,936 | De Back | Feb. 20, 1940 |
| 2,262,991 | D'Arrigo | Nov. 18, 1941 |
| 2,265,778 | Mortimer et al. | Dec. 9, 1941 |
| 2,397,433 | Reeves | Mar. 26, 1946 |
| 2,452,174 | Arnold | Oct. 26, 1948 |
| 2,485,864 | Cohen et al. | Oct. 25, 1949 |
| 2,577,211 | Scharf | Dec. 4, 1951 |
| 2,603,923 | Chidsey | July 22, 1952 |
| 2,660,529 | Bloom | Nov. 24, 1953 |
| 2,667,421 | Parks | Jan. 26, 1954 |

FOREIGN PATENTS

| | | |
|---|---|---|
| 11,340 | Great Britain | June 3, 1901 |
| 348,755 | Great Britain | May 21, 1931 |